(No Model.)
G. W. LUTZ.
APPARATUS FOR TESTING PIPES.
No. 382,172. Patented May 1, 1888.
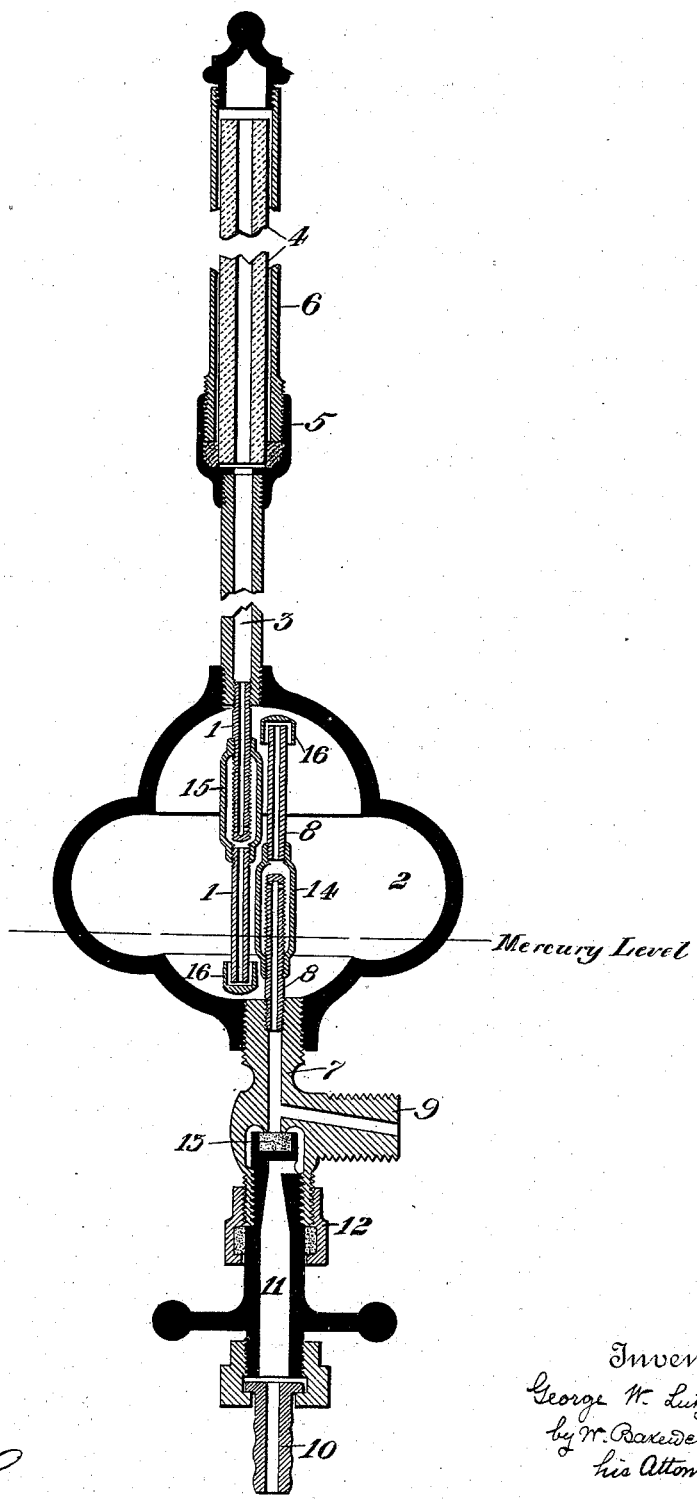

UNITED STATES PATENT OFFICE.

GEORGE W. LUTZ, OF WHEELING, WEST VIRGINIA, ASSIGNOR OF ONE-HALF TO JOHN S. TRIMBLE, OF SAME PLACE.

APPARATUS FOR TESTING PIPES.

SPECIFICATION forming part of Letters Patent No. 382,172, dated May 1, 1888.

Application filed January 10, 1888. Serial No. 260,321. (No model.)

*To all whom it may concern:*

Be it known that I, GEORGE W. LUTZ, of Wheeling, in the county of Ohio and State of West Virginia, have invented a new and useful Improvement in Apparatus for Testing Pipes; and I do hereby declare the following to be a full, clear, and exact description thereof, reference being had to the accompanying drawing, which represents a longitudinal central section of a testing-instrument constructed according to the principles of my invention.

My invention relates to an improvement in that class of instruments for testing gas pipes, &c., in which certain pressure of air is forced into the pipes, and a glass tube immersed in a vessel containing mercury is connected with the pipes, so that the compressed air shall raise and sustain a mercury column in the tube. The soundness of the pipe-fitting is then tested by observing the mercury, which remains stationary if the pipes are perfectly secure, but sinks if there is any leak in the pipes through which air may escape. A practical difficulty which has always been experienced in the use of these instruments is the liability of the mercury to spill and waste. So long as the instrument is held in a perfectly upright position the liquid of course cannot spill; but it cannot be turned upside down or laid on its side without spilling the contents, and there is danger of this even in carrying the instrument from place to place. The consequence is that instead of keeping the instrument constantly filled with mercury, as it ought to be, it must be recharged on each occasion of its use and emptied when it is not used. The workman must therefore carry the mercury about with him in a bottle, and he is continually liable to mislay or to spill it. Beside this, the repeated unscrewing of the parts made necessary to fill the instrument with mercury is apt very soon to make them loose and to leak air, and this of course spoils the instrument for practical use.

The object of my invention is to provide a testing-instrument which shall be equally effective as those heretofore in use, and which can be kept charged with mercury and held in any position without danger of spilling or wasting its contents.

Referring now to the drawing, 2 represents the chamber or vessel which contains the mercury or other liquid which is used for the purpose of indicating leaks, as before explained. This chamber is closed, except that at the top there is screwed into it a tube, 3, which extends therefrom to the required length. This is the indicating-tube, and may be made entirely of glass; but for the purpose of economy I prefer to make only the upper part, 4, of glass and to make the lower part, 3, of iron, connecting them by means of a union or coupling box, 5. The glass part 4 of this tube is protected by means of a surrounding metallic shell or casing, 6, which is made open in order to permit the glass tube to be easily seen. The tube 3 has an extension, 1, which extends inside the chamber 2 nearly to the opposite side from that where it enters the chamber. As shown in the drawing, it is preferably not constituted by a simple straight tube within the chamber 2, but it is somewhat complex in its arrangement, for purposes which I will hereinafter indicate.

In the bottom of the chamber 2 is fitted a nozzle, 7, which affords connection with the air force-pump and with the work to be tested. Inside the chamber 2 it has a tubular extension, 8, which extends across the chamber and has its mouth at the opposite end of the chamber from the mouth of the tubular extension 1 of the tube 3.

I shall describe the exact construction of the parts 1 and 8 hereinafter.

The nozzle 7 has a lateral tubular projection, 9, affording means for the connection of a pipe or coupling connecting the nozzle with the system of pipes to be tested, and it is also connected with a pipe, 10, which is adapted to be coupled to the usual force-pump.

The connection between the force-pump and the chamber 2 must be provided with some means for cutting off the escape of the air from the chamber after it has been forced thereinto, and for this purpose I employ a valve which is preferably constructed as illustrated in the drawings. This valve consists of a hollow tube, 11, connected with the pipe 10 by means of an ordinary coupling-box, 12, screwed into a tubular cavity made in the nozzle 7. The inner end of the stem 11 is provided with suitable packing, 13, and is so arranged relatively to the end of the bore of the nozzle 7 that when the stem 11 is screwed up it shall seat against that end and shall cut off communication between the force-pump and the chamber 2, but that, if the stem 11 be screwed back so as to unseat the packing 13 from the end of the bore of the nozzle 7, it shall leave a space for the passage of air through the bore of the stem 11 and through a lateral passage or cavity at the upper end of the stem and around the packing 13 into the chamber 2.

The operation is as follows: In order to fit the instrument for use, a sufficient quantity of mercury is introduced into the chamber 2, and the parts are screwed together, as shown in the drawing. Then, for the purpose of testing the security of any system of pipes, connection is made between the pipes and the connecting-nose 9, and communication is thereby established between the pipes and the chamber 2. The force-pump is then connected with the pipe 10, and the valve 11 being opened, air is forced through the pipe 10 into the system of pipes to be tested, thereby raising the pressure inside of these pipes and inside the communicating-chamber 2 to the required degree. The effect of the air-pressure in the chamber 2, acting down upon the surface of the mercury in the chamber, is to force a column of mercury up through the extension 1 of the tube 3 into this tube and into the upper glass tube, 4. When a sufficient degree of air-pressure has been established the valve 11 is closed, and then if the column of mercury in the tube 4 is maintained unchanged the operator is assured that the pipes are sound; but if the column should fall it indicates the presence of a leak. Obviously the operation of the instrument in this regard is perfectly accurate.

The special feature of advantage of the instrument is that when the mercury has been introduced it need not be taken out after each operation, because even if the valve 11 be open the instrument may be held in any position without spilling the mercury. If it be held in an upright position, the mouth of the extension of the tube 3 extends downwardly into the mercury, and the tube 8 projects above its level, so that there is no open orifice for the escape of the mercury. If the instrument be inverted, the extension of the tube 3 will then be above the level of the mercury and the mouth of the tube 8 will extend downwardly into it, so that the mercury cannot find any escape, and if the instrument be laid on its side the mouths of both tubes inside the chamber 2 will be above the level of the mercury. The instrument can therefore be handled freely and by careless or inexperienced workmen without danger of spilling the contents.

For the purpose of rendering the instrument still more secure in this regard and of preventing the small quantity of mercury in either tube from falling back and spilling when the instrument is inverted, I prefer to construct the tubes within the chamber 2 with traps, as I have shown them in the drawing, so that any such mercury would be intercepted in its passage through the tube, and on the righting of the instrument would be discharged again into the chamber 2. Thus the pipe 8, instead of being continuous, is parted in the middle, and the parts are connected by a coupling or union, 14. So, also, the other tube, 1, is parted in the middle and the parts are connected by a coupling, 15. These couplings constitute traps, so that, for example, if the instrument be standing in its proper upright position, with the lower end of the tube 1 immersed in the mercury, and it should be inverted so that the small quantity of mercury standing in the lower part of the tube should fall back, it would not pass the coupling 15, but would be caught therein, and would remain there until the instrument is again righted, when it would fall back into the chamber 2. The operation of the trap 14, in connection with the other tube, 8, is exactly similar.

For greater security against spilling, it will be noticed that I show the ends of the inner parts of the tubes 1 and 8 within the couplings 14 and 15 closed and provided with lateral orifices, the purpose being to prevent any mercury flowing back through the outer parts of the tubes from passing into the other parts thereof. This I deem to be the preferable construction.

In order to more effectually prevent the mercury, when shaken up in the chamber 2, from finding entrance into the upper one of the mouths of the tubes 1 or 8, I fit over the ends of these tubes small shields or caps 16, the arrangement and operation of which are sufficiently shown in the drawing.

I wish it to be understood that the broad claims of this patent should not be restricted to the use of these improved accessories of my invention, the only requisite being that the mouth of the test-tube and the mouth of the tube which affords communication with the work to be tested shall be on different levels in the chamber 2, and that the tubes shall be so placed within the chamber that when the instrument is laid on its side the level of the mercury shall not be such that it can escape through these tubes and out of the instrument. It will therefore be apparent that the form of the tubes, their place of entrance into the chamber 2, and their arrangement within the chamber may be very greatly modified, and that the other parts of the apparatus may also be modified. For example, in an application filed at the same time with this application there is shown a testing-instrument constructed on the principle of my present invention, but arranged so as to entirely dispense with the use of the hand-valve 11 and to make the instrument self-sealing. So, also, instead of having the tube 8 entering the chamber 2 at a point opposite to the entrance of the tube 1, it may enter the side of the chamber or at any other point.

All such modifications I desire to include within the scope of my invention herein indicated.

As I have already stated, it is necessary that the tubes 1 and 8 shall be arranged with the chamber 2, so that when the instrument is laid on its side the tube shall not afford an outlet for the mercury. For this purpose a convenient shape of the chamber 2 is that shown in the drawing, in which it is provided with an annular lateral recess or enlargement extending around it, which forms a cavity for the reception of the mercury when the instrument is laid on its side.

The form of valve which I have illustrated in the drawing is very convenient because of its simplicity, and because, being directly interposed in the line of the instrument, it takes up little room and is not liable to be disarranged. However, I do not limit myself to its use, because other forms of valve may be employed, and, as I have already suggested, it is possible to construct the instrument without any valves at all.

An important feature of my improved testing-instrument consists in the use of a compound metal and glass testing-tube. Heretofore it has been common to construct the tube entirely of glass and to connect it directly with a vessel or chamber containing the testing-liquid. This, however, is disadvantageous, because the tube from its length is very apt to be broken, and the cost of the tube makes this a serious item of expense to the plumber. I therefore prefer to construct the tube of two parts—an upper part, 4, of glass and a lower part, 3, of metal—these parts being connected by a union, 5, and suitable packing, as before explained. This very greatly decreases the cost of the tube and its liability to be broken.

I claim—

1. In a portable apparatus for testing pipes, &c., wherein a chamber containing liquid and provided with an indicating liquid-column tube is connected with the work to be tested, the combination, with the said chamber, of the indicating liquid-column tube and the tube affording connection with the work to be tested, said liquid-column tube communicating with the chamber below the normal level of the liquid, and the other tube communicating therewith above the level thereof, the mouths of said tubes being arranged at or near the middle line of the chamber, the chamber being of such shape that when the instrument is lying on its side the tubes shall not afford an escape-orifice for the liquid, substantially as and for the purposes described.

2. In an apparatus for testing pipes, &c., the combination, with a chamber containing liquid and provided with an indicating liquid-column tube, which is connected with the work to be tested, of a tube extending thereinto and provided with a trap, substantially as and for the purposes described.

3. In an apparatus for testing pipes, &c., wherein a chamber containing liquid and provided with an indicating liquid-column tube is connected with the work to be tested, the combination, with the said vessel, of the indicating liquid-column tube and the tube affording connection with the work to be tested, said tubes entering the chamber at opposite sides and extending therein in opposite directions, substantially as and for the purposes described.

4. In a device for testing pipes, &c., a chamber or vessel for containing the testing-liquid, a liquid-column tube, and a tube affording connection with the work to be tested, said liquid-column tube communicating with the chamber or vessel below the normal level of the liquid, and the other tube communicating therewith above the level thereof, the said tubes being arranged within the chamber, so that when the instrument is lying on its side the tubes shall not afford an escape-orifice for the liquid, and said tubes being provided with traps, substantially as and for the purposes described.

5. In a device for testing pipes, &c., the combination, with the chamber containing the testing-liquid and a pipe connecting the same with a force pump, of a valve interposed in the line of the pipe, said valve being constituted by a tubular stem provided with a screw-thread, whereby it is forced to its seat to close the passage through the tubular stem and away from its seat to open said passage, substantially as and for the purposes described.

6. In an apparatus for testing pipes, &c., the combination, with the chamber containing the testing-liquid, of a testing-tube extending into the chamber, said tube being constituted of two parts united by a coupling, that part which is attached to the said chamber being made of metal, and the upper part of the tube being made of glass, substantially as and for the purposes described.

7. In an apparatus for testing pipes, &c., wherein a chamber containing liquid and provided with an indicating liquid-column tube is connected with the work to be tested, the combination, with the said chamber, of a tube extending thereinto and provided with a cap over the end thereof, substantially as and for the purposes described.

In testimony whereof I have hereunto set my hand this 6th day of January, A. D. 1888.

GEORGE W. LUTZ.

Witnesses:
THOMAS W. BAKEWELL,
W. B. CORWIN.